(12) United States Patent
Lu et al.

(10) Patent No.: US 12,164,632 B2
(45) Date of Patent: Dec. 10, 2024

(54) AUTOMATICALLY DETECTING UNKNOWN PACKERS

(71) Applicant: Palo Alto Networks, Inc., Santa Clara, CA (US)

(72) Inventors: Chienhua Lu, San Jose, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 283 days.

(21) Appl. No.: 17/824,427

(22) Filed: May 25, 2022

(65) Prior Publication Data
US 2023/0385412 A1 Nov. 30, 2023

(51) Int. Cl.
G06F 21/56 (2013.01)
G06F 21/62 (2013.01)

(52) U.S. Cl.
CPC .......... *G06F 21/56* (2013.01); *G06F 21/6218* (2013.01); *G06F 2221/031* (2013.01)

(58) Field of Classification Search
CPC . G06F 21/56; G06F 21/6218; G06F 2221/031
See application file for complete search history.

(56) References Cited

U.S. PATENT DOCUMENTS

| | | | | |
|---|---|---|---|---|
| 8,104,089 B1 * | 1/2012 | Guo | ...................... | G06F 12/145 713/193 |
| 9,355,246 B1 * | 5/2016 | Wan | ...................... | G06F 21/566 |
| 9,516,055 B1 | 12/2016 | Liu | | |
| 10,122,737 B1 * | 11/2018 | McCorkendale | ... | H04L 63/1416 |
| 2009/0049550 A1 * | 2/2009 | Shevchenko | .......... | G06F 21/52 726/23 |
| 2012/0260342 A1 * | 10/2012 | Dube | .................... | G06F 21/564 726/24 |
| 2013/0091571 A1 * | 4/2013 | Lu | .......................... | G06F 21/566 726/23 |
| 2013/0227300 A1 | 8/2013 | Golovkin | | |
| 2016/0048683 A1 | 2/2016 | Sanders | | |
| 2022/0027475 A1 * | 1/2022 | Seth | ........................ | G06F 21/53 |
| 2023/0098919 A1 * | 3/2023 | Kulaga | ................. | G06F 21/565 726/23 |

OTHER PUBLICATIONS

Author Unknown, Github, Four Different Ways to Calculate Entropy in Python, May 19, 2022.
Author Unknown, GitHub, qilingframework/qiling: Qiling Advanced Binary Emulation Framework, May 22, 2022.
Author Unknown, sklearn.cluster.DBSCAN—scikit-learn 1.1.1 documentation, May 22, 2022.

(Continued)

*Primary Examiner* — Vance M Little
(74) *Attorney, Agent, or Firm* — Van Pelt, Yi & James LLP

(57) ABSTRACT

Techniques for automatically detecting unknown packers are disclosed. In some embodiments, a system/process/computer program product for automatically detecting unknown packers includes receiving a plurality of samples for malware packer detection analysis; performing a packer filter to determine whether each of the plurality of samples is packed; emulating each of the packed samples to extract a plurality of features; and clustering the packed samples based on the extracted features.

20 Claims, 10 Drawing Sheets

(56) References Cited

OTHER PUBLICATIONS

Lyda et al., Using Entropy Analysis to Find Encrypted and Packed Malware, Published by the IEEE Computer Society, 2007, pp. 40-45.
Roccia et al., Malware Packers Use Tricks to Avoid Analysis, Detection, May 16, 2017.
Stephan Simon, Creating YARA Rules Based on Code—Binary Defense, May 19, 2022.
Jung et al., Packer Identification Method Based on Byte Sequences, Concurrency and Computation: Practice and Experience, Wiley, London GB, Nov. 18, 2018.
Noureddine et al., SE-PAC: A Self-Evolving PAcker Classifier Against Rapid Packers Evolution, Proceedings of the ACM/SPEC International Conference on Performance Engineering, Apr. 26-28, 2021.

* cited by examiner

B8ff24444a8ec1b1a296dc3c1fed43ee13814354b94e075042e3e06384b06d29 (58/71) Back door:Win32/Berbew .AA!MTB B8dce2b66814e7e264d0590dce2f90d02108a5b2e51ae4a47b727f44d9b71a63 (56/71) Back door:Win32/Berbew .AA!MTB Eb7cce4c1bab9adc4f30c52943a5064872d284b81888dcf5df3a6920223a08c9 (57/71) Back door:Win32/Berbew .AA!MTB

502

504 Graph overview

| Behavior Summary | |
|---|---|
| Platform | Type |
| PE Static Analyzer (204) | pe_sa_***** (3002) |
| PE Static Analyzer (204) | pe_sa_abnl_sect_name (3003) |
| PE Static Analyzer (204) | pe_sa_abnl_num_sect (3004) |
| PE Static Analyzer (204) | pe_sa_last_exec_sect (3006) |
| PE Static Analyzer (204) | pe_sa_first_write_sect (3007) |
| PE Static Analyzer (204) | pe_sa_abnl_ep_addr (3008) |
| PE Static Analyzer (204) | pe_sa_zero_raw_size (3011) |
| PE Static Analyzer (204) | pe_sa_raw_virtual_ratio (3013) |
| PE Static Analyzer (204) | pe_sa_header_chksum_zero (3015) |
| PE Static Analyzer (204) | pe_sa_overlay (3029) |
| PE Static Analyzer (204) | pe_sa_zero_size_sect (3036) |
| PE Static Analyzer (204) | pe_sa_mem_wx_sect (3052) |
| PE Static Analyzer (204) | pe_sa_yara_info (3074) |
| PE Static Analyzer (204) | pe_sa_no_signer (3085) |

Adf65bd2f143f123f3bb747f3b319a1dbce5e2ff3c5acf1a8cb66107cbe7050d (17/69)
Adffd85873070cecd24a100085b1154e6303463266e5e8fc8bdc0fd9fd868ff0 (29/64) — 552
7ab40a3bb0e84b984d53e8c49e17ee19ce5b421e5ed8ace1072bfa6d691fadeb (33/71)

 — 554

```
; Section 6. (virtual address 00C6D000)
; Virtual size                              : 00001000 (   4096.)
; Section size in file                      : 00000200 (    512.)
; Offset to raw data for section            : 00365000
; Flags E0000040: Data Executable Readable Writable
; Alignment       : default ; Segment type: Pure code
; Segment permissions: Read/Write/Execute
fvthmrwn segment para public 'CODE' use32
assume cs:fvthmrwn
;org 106D000h
assume es:nothing, ss:nothing, ds:___, fs:nothing, gs:nothing ; Attributes: noreturn public start
start proc near
sub   esp, 4
push  eax
push  ebx
call  sub_106D00B
int   3                        ; Trap to Debugger
start endp
```

556

| Behavior Summary | |
|---|---|
| Platform | Type |
| PE Static Analyzer (204) | pe_sa_abnl_sect_name (3003) |
| PE Static Analyzer (204) | pe_sa_abnl_num_sect (3004) |
| PE Static Analyzer (204) | pe_sa_last_exec_sect (3006) |
| PE Static Analyzer (204) | pe_sa_first_write_sect (3007) |
| PE Static Analyzer (204) | pe_sa_abnl_ep_addr (3008) |
| PE Static Analyzer (204) | pe_sa_abnl_IAT (3009) |
| PE Static Analyzer (204) | pe_sa_raw_virtual_ratio (3013) |
| PE Static Analyzer (204) | pe_sa_abnl_sect_entropy (3014) |
| PE Static Analyzer (204) | pe_sa_mem_wx_sect (3052) |
| PE Static Analyzer (204) | pe_sa_no_signer (3085) |

FIG. 5B

AUTOMATICALLY DETECTING UNKNOWN PACKERS

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 5A and 5B illustrate example packer clusters determined based on experiment results for automatically detecting unknown packers in accordance with some embodiments.

DETAILED DESCRIPTION

Figure 1:
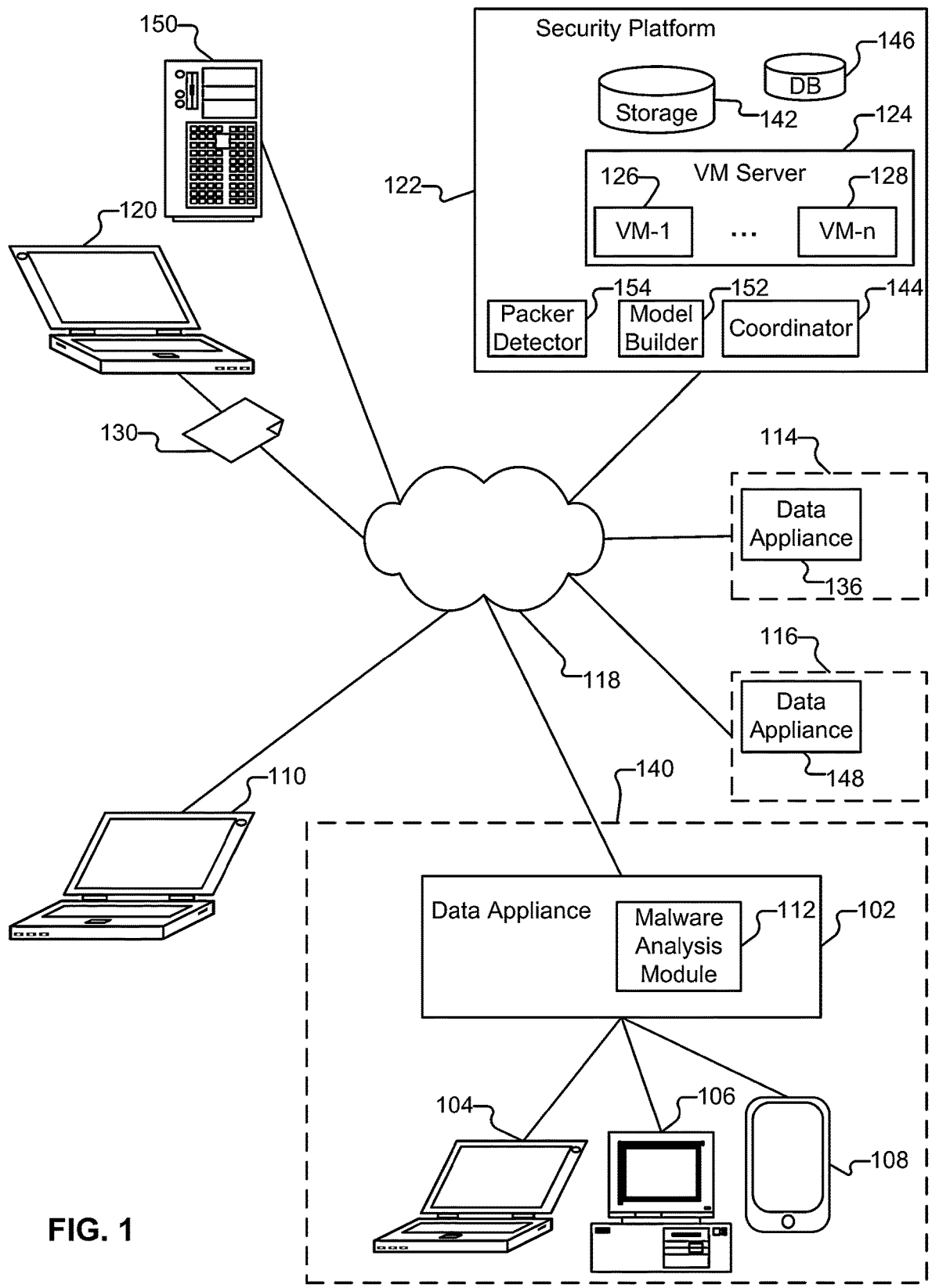
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Automatically Detecting Unknown Packers

Packers are commonly used by those who generate malware as a mechanism to avoid malware detection by anti-malware security solutions. The generation of malware variants is also facilitated by such automatic packers.

However, existing anti-malware security solutions fail to efficiently and effectively detect unknown/custom packers in the wild. For example, existing signature-based (e.g., for more information on signature-based techniques, such as creating YARA rules based on code, see, e.g., https://www-.binarydefense.com/creating-yara-rules-based-on-code/) and machine learning implemented detection solutions are generally unable to automatically detect such unknown and/or new custom packers.

Thus, what are needed are anti-malware security solutions that can efficiently and automatically detect such unknown and/or new custom packers.

Accordingly, new and improved techniques for automatically detecting unknown packers are disclosed.

In some embodiments, a system/process/computer program product for automatically detecting unknown packers includes receiving a plurality of samples for malware packer detection analysis; performing a packer filter to determine whether each of the plurality of samples is packed; emulating each of the packed samples to extract a plurality of features; and clustering the packed samples based on the extracted features.

For example, the plurality of features can include at least one or more of the following: an op code feature, a file format feature, and an application programming interface (API) feature, such as further described below with respect to various embodiments.

In some embodiments, a system/process/computer program product for automatically detecting unknown packers includes receiving a sample for inline malware packer detection analysis; performing a packer filter to determine whether the sample is packed; comparing with known packer clusters to determine whether the sample is associated with a known malware packer; and performing a responsive action based on a malware packer verdict.

For example, the disclosed techniques provide a new approach to the technically challenging packer problem for malware detection. Specifically, the disclosed techniques provide an automated solution for discovering and identifying such new and/or custom packers that is based on the observation that the same packer stub at the beginning of the entry point will include a similar concept/flow of the unpacking routine (e.g., packers can be identified and grouped as similar based on their unpacking flow and API calls) as will be further described below.

More specifically, a new packer filter that can automatically and effectively detect packed samples (e.g., malware samples) is disclosed with respect to various embodiments as further described below. Also, machine learning, domain knowledge, and an emulator can be used to automatically identify and group packers with similar unpacking routines.

The testing results validate that the disclosed techniques can accurately identify such new unknown packers that other approaches cannot identify. Moreover, the disclosed techniques resist random/junk instructions (e.g., inserting random/junk instructions into such packers is often used as a pattern evasion mechanism by malware writers) that would otherwise avoid detection by existing, traditional signature approaches as will also be further described below.

The disclosed techniques for automatically detecting unknown packers reduce the labor intensive effort as compared with the existing, traditional signature approach that requires significant time and effort by malware analysts to perform a manual analysis of packers in order to attempt to detect and generate new signatures for previously unknown packers. Traditionally, malware analysts would need to find such a new/custom packer, group/classify the packer, and manually create a new signature for the packer.

Also, as similarly discussed above, the disclosed techniques for automatically detecting unknown packers are generally superior to existing, traditional signature-detection approaches, because signature-based detection approaches are evaded by malware writers by using junk instructions/pattern evasion approaches that can avoid detection by such signatures. Moreover, such junk instructions/pattern evasion approaches are costly for security solutions as such result in hash changes that can require additional/re-analysis of previously identified packers for known malware.

Further, packer information correlation as further described below can expand the ground truth beyond multi-scan and VirusTotal (e.g., VirusTotal was founded in 2004 as a free online service that analyzes files and URLs for viruses, worms, trojans, and other kinds of malicious content, see https://www.virustotal.com). For example, if a sample is not available on VirusTotal but has the same custom unpacking routine related to malware family, then it can be determined that they are highly related.

Accordingly, new and improved security solutions that facilitate automatically detecting unknown packers using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for automatically detecting unknown packers will be further described below.

Example System Architectures for Automatically Detecting Unknown Packers

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for automatically detecting unknown packers as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/custom packer related malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is a desktop/mobile application that collects and reports to a remote server the end user's activities and/or various information associated with the user (e.g., spyware). Other forms of malware (e.g., keyloggers) can also be detected/thwarted using the improved and automated packer detection techniques as will be further described herein.

The term "packer" is used throughout the Specification to collectively refer to what is also commonly called "runtime packers," which are also known as "self-extracting archives." As such, packers can be used to provide software that unpacks itself in memory when the "packed file" is executed. This approach is also sometimes called "executable compression." While this type of compression was originally developed to make files smaller for distribution and storage, such is now often used by malware writers (e.g., hackers) to mask malware (e.g., in an effort to evade analysis and detection by existing security solutions).

A packer (e.g., a malware packer) is now commonly used by malware writers (e.g., hackers) to avoid detection by existing security solutions (e.g., for more information on how malware packers use various tricks to avoid analysis and detection by existing security solutions, see, e.g., https://www.mcafee.com/blogs/enterprise/malware-packers-use-tricks-avoid-analysis-detection/). Specifically, a malware packer is a tool that can be used to mask malware (e.g., in an effort to conceal/obfuscate a malicious file/payload from detection by existing security solutions). More specifically, packers can encrypt, compress, and/or simply change the format of a malware file/payload to make it appear as some other content in an effort to avoid malware analysis and detection by existing security solutions.

There are many existing commercially available packers. Attackers/hackers can use such existing commercially available packers for packing their malware files/payloads, but hackers often modify or customize these packers to make it more technically challenging for security solutions to detect their packed malware.

Given that packers are commonly used by hackers, detection of packers can be used by security solutions to detect malware, as well as to identify and classify/group malware based on the associated packer.

However, as further discussed herein, automated detection of packers activities is increasingly a technical challenge as new and/or custom packers have become more prevalent as well as more sophisticated and often evade detection of existing packer detection approaches including signature-based packer detection and static machine learning related packer detection approaches.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of packers (e.g., new and/or custom packers, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
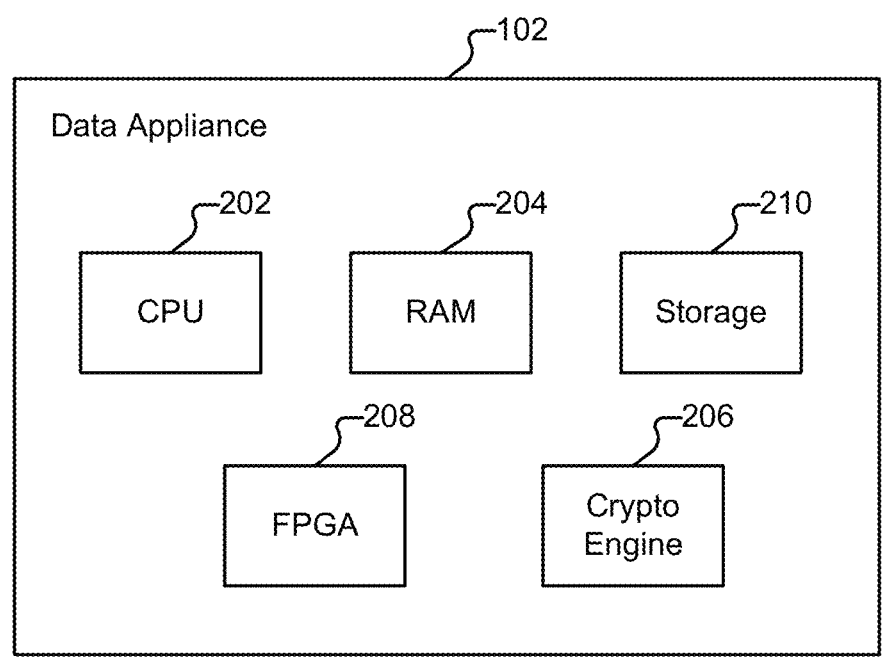
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
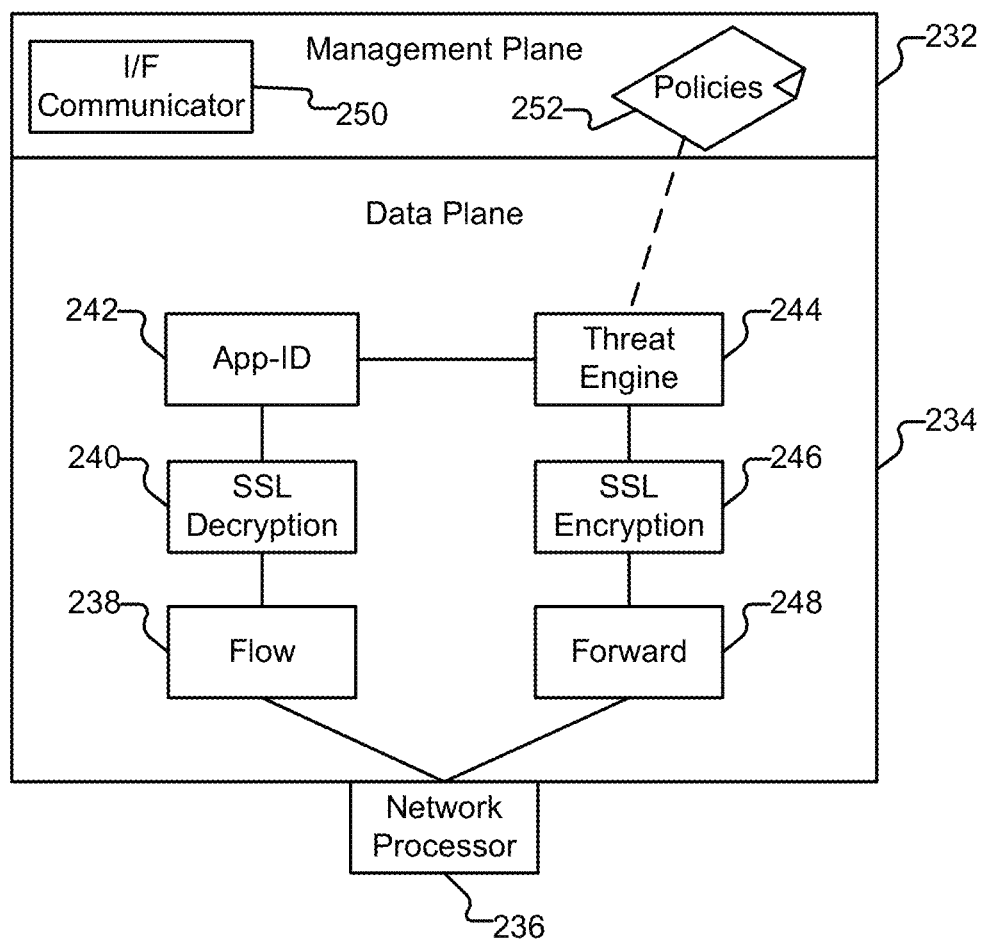
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include packer/malware detection policies using the disclosed techniques for automated detection of unknown/custom packers. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130 using a custom packer (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for automated detection of unknown/custom packers and block access from Alice's client device 104 to the packed malware content and to thereby preempt and prevent any such download of malware 130 to Alice's client device 104. As will be further described below, data appliance 102 performs the disclosed techniques for automated detection of unknown/custom packers, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing automated detection of unknown/custom packers, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for automated detection of unknown/custom packers usable by data appliance 102 to perform inline analysis of such malware files as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for automated detection of unknown/custom packers, etc. (e.g., daily, hourly, or some other interval, and/or based on an event configured by one or more policies). An example content package includes a packet detector 154 and/or other information (e.g., packer detection models), such as further described below. The subscription can cover the analysis of just those files intercepted by data appliance 102 and sent to security platform 122 by data appliance 102, and can also cover signatures of malware known to security platform 122. As will be described in more detail below, platform 122 can also make available other types of information for automated detection of unknown/custom packers using packer detection models generated using model builder 152 and packer detector 154 (e.g., as will be further described below, such as with respect to FIGS. 4A and 4B), which is performed using the disclosed automated custom/unknown packer detection techniques that can help data appliance 102 detect and perform inline blocking of malware that was created using such custom/unknown packers.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
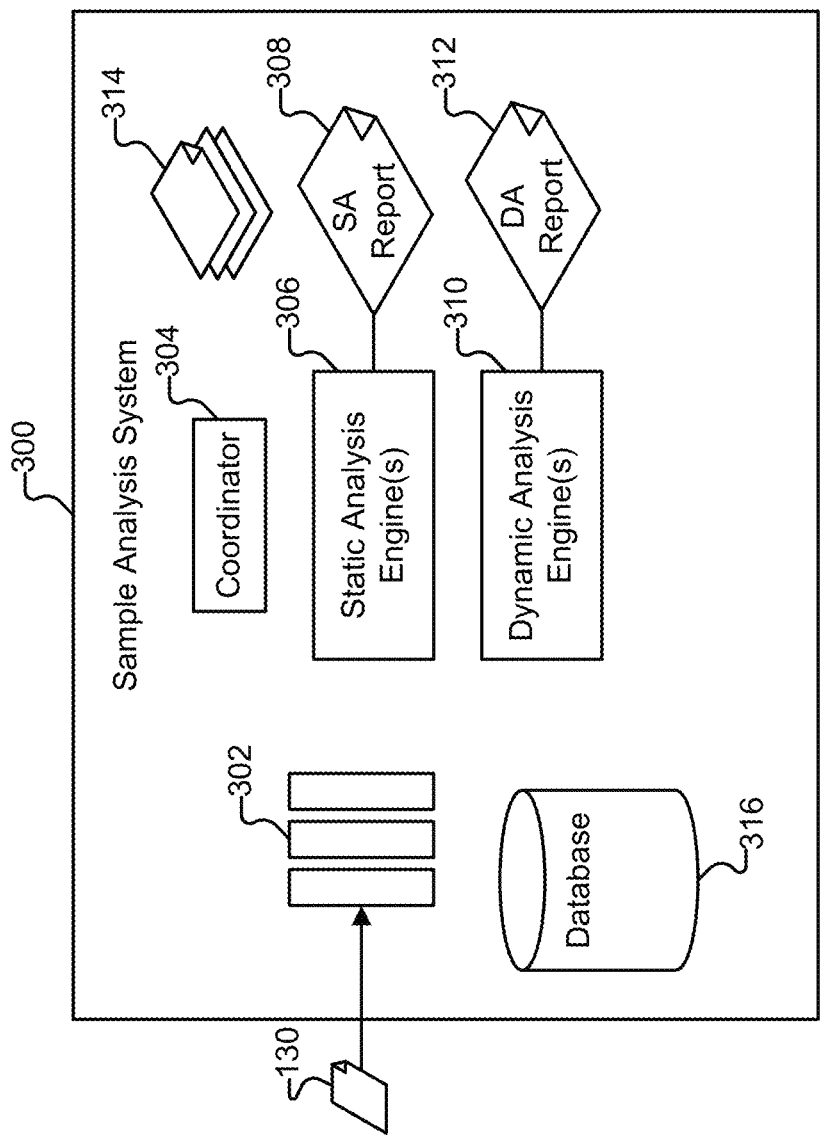
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Automatically Detecting Unknown Packers

Figure 4A:
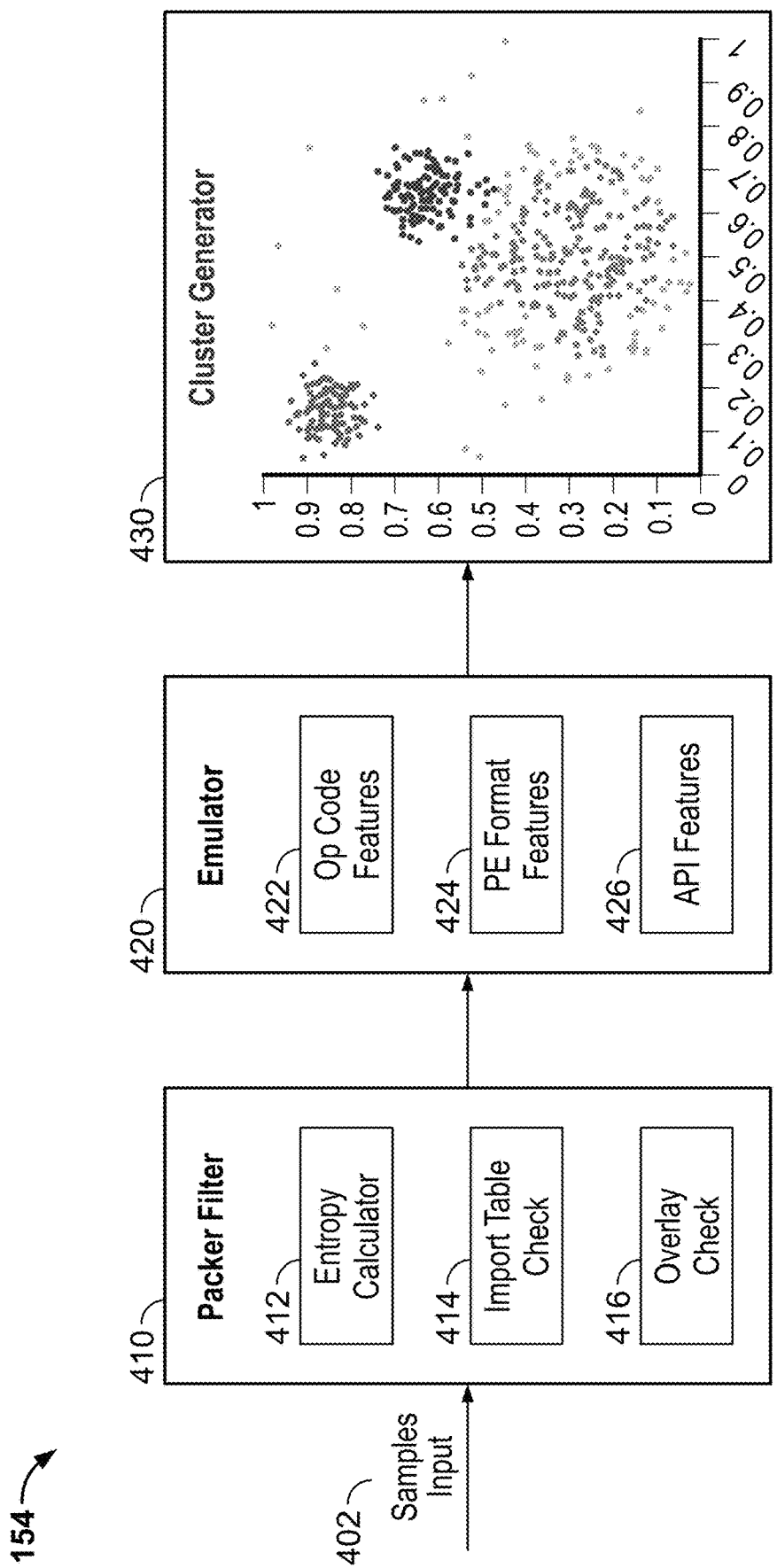
FIG. 4A illustrates portions of an example embodiment of a packer detector for automatically detecting unknown packers in accordance with some embodiments.

FIG. 4A illustrates portions of an example embodiment of a packer detector for automatically detecting unknown packers in accordance with some embodiments. As similarly discussed above, in various embodiments, security platform 122 includes a packer detector 154. The packer detector includes a packer filter 410 that performs various operations to determine whether a given sample input 402 is a packed sample as will be further described below. Samples that are determined to be packed samples are then provided to an emulator 420. The emulator performs various operations to extract predetermined features from the packed sample as will also be further described below. The extracted features of the packed sample are then provided to a cluster generator 430. The cluster generator uses the extracted features to perform clustering operations to generate a plurality of clusters of packed samples as will be further described below. For example, packed samples with similar features are generally associated with a given cluster as will be further described below. Each of these components can be implemented in Python and/or high-level programming languages and use various open source or publicly available components such as will be further described below.

Referring to packer filter 410, the packer filter includes an entropy calculator component 412. Generally, the packer filter reduces the number of samples for further analysis by identifying samples from the set of input samples (402) that are packed samples and/or likely packed samples (e.g., this packer filtering operation can improve clustering quality and reduce processing volume for the feature extraction and clustering operations by reducing false negatives, as such, only performing further analysis on (likely) packed samples). The entropy calculator performs an entropy calculation based on the contents of the binary code in the sample. If the result of the entropy calculation exceeds a threshold entropy (e.g., in an example implementation, if the entropy is higher than 7, we can confidently make a determination that it is a packed sample, see, e.g., https://www.semanticscholar.org/paper/Using-Entropy-Analysis-to-Find-Encrypted-and-Packed-Lyda-Hamrock/86bf19a53e70d346d2105e4a3bcd9a588b943dcd/figure/0), then that result is used as a factor to determine that the sample is likely a packed sample (e.g., packers generally increase the entropy associated with the contents of the sample by using compression, obfuscation, and/or other techniques to pack the sample). There are various existing libraries in Python for determining an entropy calculation for content, such as a file/sample (e.g., example Python library implementations for performing an entropy calculation are publicly available at https://gist.github.com/jaradc/eeddf20932c0347928d0da5a09298147).

Referring to packer filter 410, the packer filter also includes an import table check component 414. The abnormal import table component can be implemented as a set of heuristics to determine whether or not an import table associated with, for example, a Microsoft Windows PE file is abnormal. The determination of an abnormal import table is used as another factor to determine that the sample is likely a packed sample (e.g., a packed sample is generally more likely to not have attributes that are typically associated with unpacked Microsoft Windows PE files). As an example, an import table that imports zero libraries can be deemed as abnormal (e.g., suspicious and likely associated with packed malware).

In an example implementation of heuristics/rules for import table check component 414, the following heuristics can be used to identify suspicious Windows PE files/formats and/or abnormal import tables of Microsoft Windows PE files.

pe_sa_last_exec_sect: last section of PE has exec permissions.

Pe_sa_first_write_sect: first section of PE has write permissions.

pe_sa_abnl_ep_addr: the entry point address is abnormal, ex: outside of the file.

pe_sa_abnl_IAT: abnormal import table format. This is an example of a heuristic/rule for detecting an abnormal import table.

pe_sa_abnl_sect_entropy: the entropy of section is abnormal.

pe_sa_ol_entropy: calculate entropy of the overlay as a ML feature.

pe_sa_zero_size_sect: count the number of the zero size section as a ML feature.

pe_sa_mem_wx_sect: count the number of section with write/execution attribute as a ML feature.

pe_sa_err_delay_imp_dir: if there is an error or not during parsing the delay import directory as a ML feature. This is another example of a heuristic/rule for detecting an abnormal import table.

pe_sa_err_imp_dir: if there is an error or not during parsing the import directory. This is another example of a heuristic/rule for detecting an abnormal import table.

pe_sa_errparsing_imp_table: if there is an error or not during parsing the delay import table. This is another example of a heuristic/rule for detecting an abnormal import table.

Referring to packer filter 410, the packer filter also includes an overlay check component 416. The overlay check component determines whether a sample includes an overlay and if that overlay is suspicious/potentially associated with a malware packer. Overlay generally refers to the data at the end of the Windows PE file and is not defined by the file header. Three example features for checking the overlay include the following: (1) has an overlay; (2) overlay size (e.g., to determine if the overlay size is abnormally large or small); and (3) entropy of the overlay (e.g., an overlay entropy below 4 is plain text; an overlay entropy between 4 and 5 is executable; an overlay entropy between 6 and 7 is packed code; and an overlay entropy above 7 is encrypted data).

Referring to emulator 420, the emulator component provides an instrumented environment for emulating the first N number of instructions (e.g., the first 100 instructions, 500 instructions, 1000 instructions, etc.) at an entry point of a given sample that includes executable code (e.g., a Microsoft Windows PE file, or other executable file formats can similarly be emulated). In example experiments (e.g., as described below with respect to FIGS. 5A and 5B), the emulator component was configured to emulate the first 100 instructions at an entry point of Microsoft Windows PE sample files. The emulation environment is instrumented in order to monitor the activities associated with the sample during the emulation in order to extract various types of features that can subsequently be to cluster the packed samples as will now be described below.

Referring to emulator 420, the emulator includes an op code features component 422. The op code features component generates a feature vector for predetermined op codes. In an example implementation of the op code features component for analysis of Microsoft Windows PE files, a set of 112 distinct op codes were selected as features and the remaining op codes were grouped into a single feature (e.g., of ~1500 op codes in an x86 computing platform, a subset of 112 op codes were selected based on an emulated analysis of nine common malware packer families in which these 112 op codes were most frequently observed during the emulation of these nine common malware packer families, and the remaining op codes were simply counted as a catch-all "other opcodes" feature value in this op codes feature vector). As such, the op codes feature vector includes a count for each of these predetermined op codes observed during the emulation analysis described above (e.g., no operation (NOP) instructions can be removed from this emulation analysis). These op code features can subsequently be used during the clustering operations (430).

A list of example op code features for an x86 computing platform is provided below (e.g., op codes observed as executed during the emulation analysis).

```
instr_list = ['adc',
'add',
'and',
'bnd ret',
'bsf',
'bsr',
'bswap',
'bt',
'btr',
'bts',
'call',
'cbw',
'clc',
'cld',
'cmc',
'cmova',
'cmp',
'cpuid',
'cwde',
'dec',
'div',
'enter',
'fadd',
'fild',
'fistp',
'fld',
'fldcw',
'fnclex',
'fninit',
'fnop',
'fnstcw',
'fstp',
'fsub',
'imul',
'inc',
'int3',
'ja',
```

```
'jae',
'jb',
'jbe',
'je',
'jg',
'jge',
'jl'
'jle',
'jmp',
'jne',
'jno',
'jnp',
'jns',
'jo',
'jp',
'jrcxz',
'js',
'lar',
'lea',
'leave',
'lock add',
'lock cmpxchg',
'lodsb',
'lodsd',
'loop',
'mov',
'movapd',
'movsb',
'movsd',
'movsx',
'movsxd',
'movzx',
'neg',
'nop', #<-- this should be removed
'not',
'or',
'pop',
'popfq',
'push',
'pushf',
'pushfq',
'rcl',
'rcr',
'rep movsb',
'rep movsd',
'rep stosd',
'ret',
'rol',
'ror',
'sal',
'sar',
'sbb',
'scasb',
'seta',
'setbe',
'sete',
'setge',
'setne',
'shl',
'shld',
'shr',
'shrd',
'sidt',
'sldt',
'stc',
'stosb',
'stosd',
'str',
'sub',
'test',
'verr',
'wait',
'xchg',
'xor']
```

Referring to emulator 420, the emulator also includes a PE format features component 424. The PE format features component extracts various predetermined features associated with a Microsoft Windows PE file determined during the emulator analysis of the sample. These PE format features can subsequently be used during the clustering operations (430). Examples of the PE format features include features related to the PE format structure, entropy, entry point, and size of the format (e.g., pe_sa_last_exec_sect, pe_sa_first_write_sect, pe_sa_abnl_ep_addr, pe_sa_abnl_sect_entropy, pe_sa_zero_size_sect, and pe_sa_mem_wx_sect).

Referring to emulator 420, the emulator also includes an API features component 426. The API features component extracts various predetermined APIs (e.g., API calls that are generally associated with a virtual memory attack, etc.) that are called during the emulator analysis of the sample. These API features can subsequently be used during the clustering operations (430). In an example implementation, the emulator can be implemented using a publicly available binary emulation framework, such as available at https://github.com/qilingframework/qiling.

A list of example APIs (e.g., API features) for an x86 computing platform is provided below (e.g., APIs observed as called during the emulation analysis).

```
'CharNextA'
'CharNextW'
'CreateDirectoryA'
'CreateFileA'
'CreateWindowExA'
'DecodePointer'
'EncodePointer'
'EnterCriticalSection'
'ExitProcess'
'FlsAlloc'
'FlsSetValue'
'GetCPInfo'
'GetCommandLineA'
'GetCommandLineW'
'GetCurrentProcessId'
'GetCurrentThreadId'
'GetEnvironmentVariableA'
'GetKeyboardType'
'GetLastError'
'GetLocaleInfoA'
'GetMessageA'
'GetModuleFileNameA'
'GetModuleHandleA'
'GetModuleHandleW'
'GetProcAddress'
'GetProcessHeap'
'GetStartupInfoA'
'GetStartupInfoW'
'GetSystemDirectoryA'
'GetSystemDirectoryW'
'GetSystemTimeAsFileTime'
'GetTempPathA'
'GetThreadLocale'
'GetTickCount'
'GetVersion'
'GetVersionExA'
'GetVersionExW'
'GetWindowsDirectoryA'
'HeapAlloc'
'HeapCreate'
'HeapFree'
'HeapSetInformation'
'HeapSize'
'InitCommonControls'
'InitCommonControlsEx'
'InitializeCriticalSection'
'InitializeCriticalSectionAndSpinCount'
'InitializeCriticalSectionEx'
'InterlockedCompareExchange'
'InterlockedExchange'
'InterlockedIncrement'
'IsBadReadPtr'
'IsDBCSLeadByte'
```

-continued

'IsProcessorFeaturePresent'
'LeaveCriticalSection'
'LoadCursorA'
'LoadIconA'
'LoadLibraryA'
'LoadLibraryExA'
'LoadLibraryExW'
'LoadLibraryW'
'LocalAlloc'
'MessageBoxA'
'OleInitialize'
'QueryPerformanceCounter'
'RegOpenKeyExA'
'RegisterClassExA'
'SHGetFileInfoA'
'SHGetFileInfoW'
'SetDefaultDllDirectories'
'SetDllDirectoryW'
'SetErrorMode'
'SetThreadLocale'
'SetUnhandledExceptionFilter'
'ShowWindow'
'ThunRTMain'
'TlsAlloc'
'TlsGetValue'
'TlsSetValue'
'UpdateWindow'
'VerSetConditionMask'
'VerifyVersionInfoA'
'VirtualAlloc'
'VirtualProtect'
'WSAStartup'
'__EH_prolog'
'___getmainargs'
'___p___commode'
'___p___fmode'
'___set_app_type'
'__controlfp'
'__initterm'
'__ismbblead'
'__lock'
'__lopen'
'lstrcpyA'
'lstrcpynA'
'lstrcpynW'
'malloc'
'wsprintfA'

Referring to cluster generator 430, the cluster generator component receives the features extracted during the emulation analysis from emulator 420. The cluster generator utilizes the features to cluster the packed samples into families as shown in FIG. 4A. In an example implementation, density-based special clustering of applications with noise (DBScan) can be used to cluster the packed samples based on a feature distance perspective (e.g., a publicly/commercially available implementation of DB Scan can be used, such as available at https://scikit-learn.org/stable/, see also https://scikit-learn.org/stable/modules/generated/sk-learn.cluster.DBSCAN.html, and/or another clustering algorithm can similarly be used to cluster the packed samples based on the extracted features, such as k-means clustering, mean shift clustering, HDB SCAN clustering, etc.).

In an experiment based on a sample input set of approximately 10,000 PE files, approximately 5,900 of these samples were determined to be (likely) packed using the packer filter. The clustering of the resulting 5,900 (likely) packed samples based on their extracted features was performed using DBScan and generated 53 distinct packer clusters. It should be noted that the results also included previously unknown/custom packers that were not previously identified by security vendors (e.g., not included in VirusTotal or other vendor data for known packers). Also, deep analysis of these packer clusters revealed interesting common and distinctive features associated with the relevant packers analyzed during this experiment.

Accordingly, the generated clustering operation output that provides these resulting packer clusters can then be further analyzed to automatically extract unique signatures to efficiently and effectively identify each packer family (e.g., as such packer families typically have interesting and distinctive features). These signatures can then be used to provide for malware detection using the data appliance (102) and/or the cloud-based security service (122).

Moreover, the above-described techniques for automatically detecting unknown packers can similarly be implemented to provide a new inline malware packer detection solution, such as will now be described below with respect to FIG. 4B.

Figure 4B:
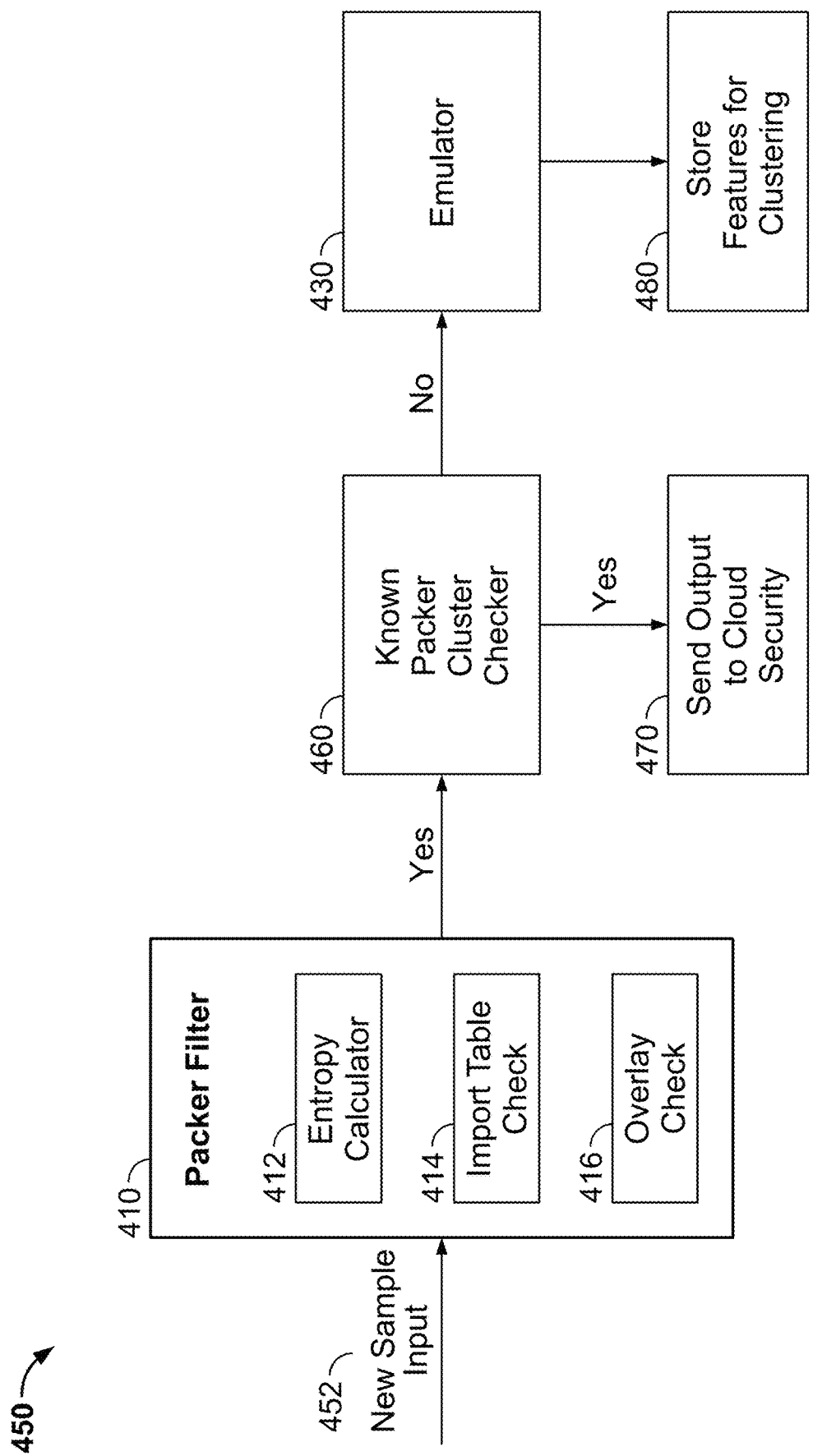
FIG. 4B illustrates portions of an example embodiment of an inline packer detector for automatically detecting unknown packers in accordance with some embodiments.

FIG. 4B illustrates portions of an example embodiment of an inline packer detector for automatically detecting unknown packers in accordance with some embodiments. In an example implementation, an inline packer detector 450 is implemented as a component of malware analysis module 112 and is executed on data appliance 102 (e.g., as shown in FIG. 1).

Referring to FIG. 4B, a new sample input 452 is received at the inline packer detector. The new sample is analyzed using packet filter 410, which can be implemented as similarly described above with respect to FIG. 4A. If the sample is determined to be (likely) packed, then the sample is further analyzed using a known packer cluster checker 460 (e.g., if the sample is not determined to be (likely) packed, then no further analysis is performed using the inline packer detector).

Referring to known packer cluster checker 460, the known packer cluster checker can receive periodic clustering data results from security platform 122 (e.g., using packer detector 154, such as similarly described above with respect to FIGS. 1 and 4A).

If the known packer cluster checker determines that the sample matches an existing known packer cluster, then the resulting output is sent to a cloud security solution (e.g., security platform 122 as shown in FIG. 1) as shown at 470. For example, the cloud security solution can utilize the resulting output to provide further analysis and to further update the known packer clustering data set, which can then be periodically distributed to inline packer detection solutions, such as implemented on data appliance 102 (e.g., data appliances with the inline packer detector component and a subscription to receive periodically updated known packer clustering information from the cloud security solution).

If the known packer cluster checker determines that the sample does not match an existing known packer cluster, then the sample is provided to emulator 430, which can be implemented as similarly described above with respect to FIG. 4A. The features extracted during the emulation analysis are stored for clustering as shown at 480. The stored features can be used for further clustering (e.g., performed locally using data appliance 102 and/or provided to the cloud security solution to be performed using security platform 122, such as similarly described above with respect to FIGS. 1 and 4A). The updated clustering results can then be utilized to determine whether the sample is associated with a known packer cluster.

The inline packer detector can generate a malware packer verdict based on the results of the sample processed using the inline packer detector (450). The data appliance (102) can then perform an action based on a policy (e.g., security policy) in response to the malware packer verdict. For example, the data appliance can be configured to block access to and/or storage of the sample if it is determined to be associated with a known malware packer (e.g., to prevent an endpoint device from receiving, storing, opening, and/or executing the sample). Other example actions can include logging the sample as determined to be associated with a known malware packer, blocking/dropping the sample, alerting an endpoint user and/or a network/security administrator that the sample was determined to be associated with a known malware packer, quarantining an endpoint device associated with the sample, identifying a source IP address, URL, etc. associated with the sample as malicious (or potentially malicious), and/or various other actions can also be performed based on the policy.

Accordingly, the disclosed techniques for automatically detecting unknown packers can be implemented to be performed using inline malware detection, such as on data appliance 102 (e.g., and/or on endpoints, such as client devices 104, 106, and 108, using a security agent executed on the protected endpoint), and can also be performed as a cloud-based security service, such as using security platform 122, as described herein.

Various example use cases of automatically detecting unknown packers will now be described.

Example Use Cases of Automatically Detecting Unknown Packers

FIGS. 5A and 5B illustrate example packer clusters determined based on experiment results for automatically detecting unknown packers in accordance with some embodiments.

Referring to FIG. 5A, a mysterious cryptor packer cluster was discovered based on experiment results for automatically detecting unknown packers. As shown, this malware packer performs various malicious operations, such as shown at 502, exhibits an unpacking flow as shown at 504 (e.g., revealing a similar unpack flow at the beginning), and exhibits various behaviors as summarized at 506 (e.g., using similar junk instruction tricks, such as NOP instructions and meaningless calls and jump (jmp) operations). This malware packer had not been previously identified by existing security solutions for detecting malware (e.g., VirusTotal had not previously identified this malware packer and there was not an existing packer signature for this previously not known malware packer).

Referring to FIG. 5B, a Themida variant packer cluster was discovered based on experiment results for automatically detecting unknown packers. As shown, this malware packer performs various malicious operations, such as shown at 552, uses the same anti-debugging mechanism at the beginning as shown at 554 (e.g., includes the same call graph at the beginning and uses an Int3 operation to trap the debugger), and exhibits various behaviors as summarized at 556. This malware packer had also not been previously identified by existing security solutions for detecting malware (e.g., VirusTotal had not previously identified this malware packer and there was not an existing packer signature for this previously not known malware packer).

Additional example processes for the disclosed techniques for automatically detecting unknown packers will now be described.

Example Processes for Automatically Detecting Unknown Packers

Figure 6:
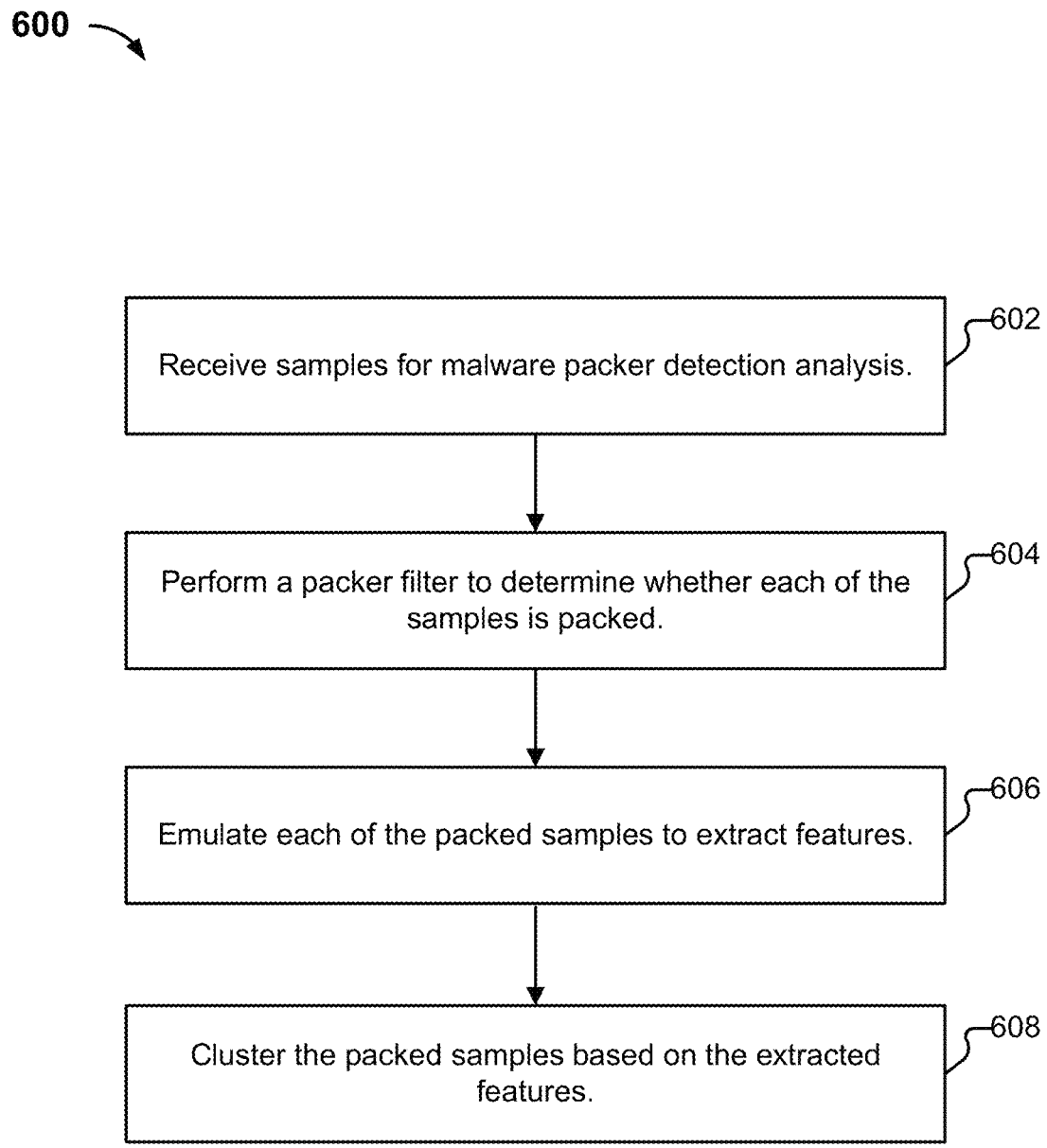
FIG. 6 is a flow diagram of a process for automatically detecting unknown packers in accordance with some embodiments.

FIG. 6 is a flow diagram of a process for automatically detecting unknown packers in accordance with some embodiments. In some embodiments, a process 600 as shown in FIG. 6 is performed by the security platform and techniques as similarly described above including the embodiments described above with respect to FIGS. 1-4B. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, samples are received for malware packer detection analysis. For example, data appliance 102 and/or security appliance 122 can receive one or more input samples for malware packer detection analysis as similarly described above with respect to FIGS. 1-4B.

At 604, a packer filter is performed to determine whether each of the samples is packed. For example, the packer filter can be performed using entropy calculator component 412, import table check component 414, and/or overlay check component 416 of packer filter 410 as similarly described above with respect to FIGS. 4A and 4B.

At 606, an emulator is performed to emulate each packed sample. For example, the emulator can be performed to extract various features for clustering based on the extracted features as similarly described above with respect to FIGS. 4A and 4B.

At 608, the packed samples are clustered based on the extracted features. For example, a cluster generator can be used to cluster the packed samples based on the extracted features as similarly described above with respect to FIGS. 4A and 4B. As also similarly described above, newly identified malware packers (e.g., and/or malware packer families) can then be further analyzed for generating, for example, new signatures for automatically detecting such newly identified malware packers (e.g., and/or malware packer families).

Figure 7:
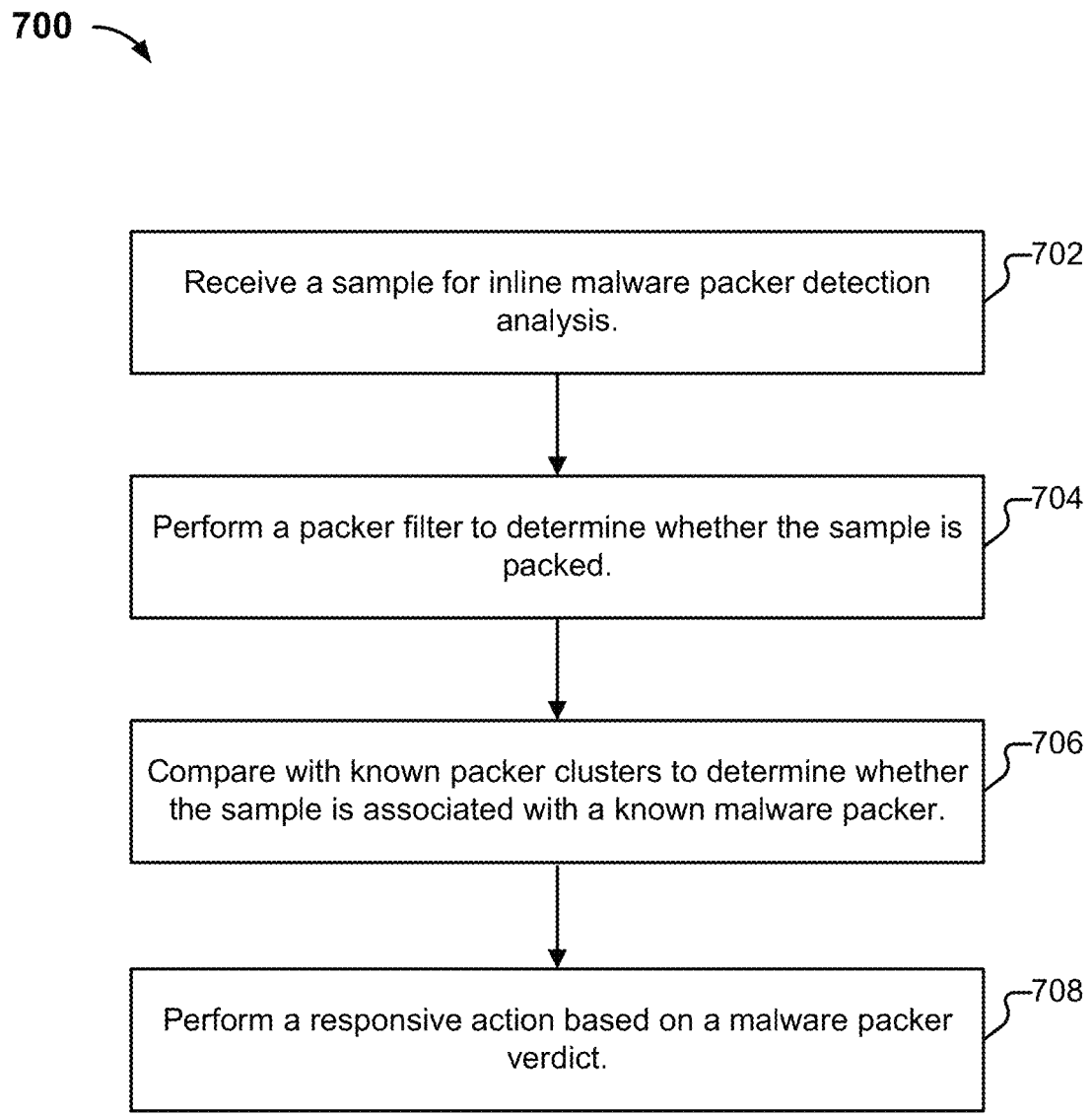
FIG. 7 is a flow diagram of an inline process for automatically detecting unknown packers in accordance with some embodiments.

FIG. 7 is a flow diagram of an inline process for automatically detecting unknown packers in accordance with some embodiments. In some embodiments, a process 700 as shown in FIG. 7 is performed by the security platform and techniques as similarly described above including the embodiments described above with respect to FIGS. 1-4B. In one embodiment, process 700 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, a sample is received for inline malware packer detection analysis. For example, data appliance 102 (e.g., and/or security appliance 122, as such inline malware packer detection analysis can similarly be performed by the cloud security service) can receive one or more samples for an inline malware packer detection analysis as similarly described above with respect to FIGS. 1-4B.

At 704, a packer filter is performed to determine whether each of the samples is packed. For example, the packer filter can be performed using entropy calculator component 412, import table check component 414, and/or overlay check component 416 of packer filter 410 as similarly described above with respect to FIGS. 4A and 4B.

At 706, the packed sample is compared with known malware packer clusters to determine whether the sample is associated with a known malware packer. For example, the known malware packer cluster comparison can be performed using known packer cluster checker 460 as similarly described above with respect to FIG. 4B.

At 708, a responsive action based on a malware packer verdict is performed. As similarly described above with respect to FIG. 4B, malware packers can be detected based on the verdict/results of the inline packer detection analysis. In an example implementation, the inline packer detector can generate a malware packer verdict based on the results of the sample processed using the inline packer detector (e.g., inline packer detector 450 as shown in FIG. 4B). The data appliance (102) can then perform an action based on a policy (e.g., malware packer policy, which can be stored in policies 252 as shown in FIG. 2B) in response to the malware packer verdict. For example, the data appliance can be configured to block access to and/or storage of the sample if it is determined to be associated with a known malware packer (e.g., to prevent an endpoint device from receiving, storing, opening, and/or executing the sample). Other example actions can include logging the sample as determined to be associated with a known malware packer, blocking/dropping the sample, alerting an endpoint user and/or a network/security administrator that the sample was determined to be associated with a known malware packer, quarantining an endpoint device associated with the sample, identifying a source IP address, URL, etc. associated with the sample as malicious (or potentially malicious), and/or various other actions can also be performed based on the policy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive a plurality of samples for malware packer detection analysis;
   perform a packer filter to determine whether a sample of the plurality of samples is packed, comprising to:
   perform one or more of the following:
   A) determine that the sample includes a Microsoft portable executable (PE) file and that the Microsoft Windows PE file is suspicious, comprising to:
   determine that the Microsoft Windows PE file is abnormal, wherein an abnormal Microsoft Windows PE file includes a last section of the Microsoft Windows PE file has exec permissions, a first section of the Microsoft Windows PE file has write permissions, an entry point address of the Microsoft Windows PE file is outside of the Microsoft Windows PE file, an import table of the Microsoft Windows PE file is abnormal, or any combination thereof; and
   in response to a determination that the Microsoft Windows PE file is abnormal, determine that the sample is suspicious;
   B) determine that the sample includes an overlay and that the overlay is suspicious, comprising to:
   determine that the sample includes the overlay; and
   in the event that the sample include the overlay:
   determine that an entropy of the overlay exceeds an entropy threshold; and
   in response to a determination that the entropy of the overlay exceeds the entropy threshold, determine that the sample is suspicious;
   emulate each of the packed samples to extract a plurality of features; and
   cluster the packed samples based on the extracted features; and
   a memory coupled to the processor and configured to provide the processor with instructions.

2. The system of claim 1, wherein the plurality of features includes an op code feature.

3. The system of claim 1, wherein the plurality of features includes a file format feature.

4. The system of claim 1, wherein the plurality of features includes an application programming interface (API) feature.

5. The system of claim 1, wherein the plurality of features includes at least two of the following: an op code feature, a file format feature, and an application programming interface (API) feature.

6. The system of claim 1, wherein the plurality of features includes an op code feature, a file format feature, and an application programming interface (API) feature.

7. The system of claim 1, wherein detecting a previously unknown malware packer is performed using a security platform of a cloud service.

8. The system of claim 1, wherein the perform of the packer filter comprises to:
   determine that the sample includes a Microsoft portable executable (PE) file and that the Microsoft Windows PE file is suspicious, comprising to:
   determine that the Microsoft Windows PE file is abnormal, wherein an abnormal Microsoft Windows PE file includes a last section of the Microsoft Windows PE file has exec permissions, a first section of the Microsoft Windows PE file has write permissions, an entry point address of the Microsoft Windows PE file is outside of the Microsoft Windows PE file, an import table of the Microsoft Windows PE file is abnormal, or any combination thereof; and
   in response to a determination that the Microsoft Windows PE file is abnormal, determine that the sample is suspicious.

9. The system of claim 1, wherein the perform of the packer filter comprises to:
   determine that the sample includes an overlay and that the overlay is suspicious, comprising to:
   determine that the sample includes the overlay; and
   in the event that the sample include the overlay:
   determine that an entropy of the overlay exceeds an entropy threshold; and
   in response to a determination that the entropy of the overlay exceeds the entropy threshold, determine that the sample is suspicious.

10. A method, comprising:
receiving a plurality of samples for malware packer detection analysis;
performing a packer filter to determine whether a sample of the plurality of samples is packed, comprising:
performing one or more of the following:
A) determining that the sample includes a Microsoft portable executable (PE) file and that the Microsoft Windows PE file is suspicious, comprising:
determining that the Microsoft Windows PE file is abnormal, wherein an abnormal Microsoft Windows PE file includes a last section of the Microsoft Windows PE file has exec permissions, a first section of the Microsoft Windows PE file has write permissions, an entry point address of the Microsoft Windows PE file is outside of the Microsoft Windows PE file, an import table of the Microsoft Windows PE file is abnormal, or any combination thereof; and
in response to a determination that the Microsoft Windows PE file is abnormal, determining that the sample is suspicious;
B) determining that the sample includes an overlay and that the overlay is suspicious, comprising:
determining that the sample includes the overlay; and
in the event that the sample include the overlay:
determining that an entropy of the overlay exceeds an entropy threshold; and
in response to a determination that the entropy of the overlay exceeds the entropy threshold, determining that the sample is suspicious;
emulating each of the packed samples to extract a plurality of features; and
clustering the packed samples based on the extracted features.

11. The method of claim 10, wherein the plurality of features includes an op code feature.

12. The method of claim 10, wherein the plurality of features includes a file format feature.

13. The method of claim 10, wherein the plurality of features includes an application programming interface (API) feature.

14. The method of claim 10, wherein the plurality of features includes at least two of the following: an op code feature, a file format feature, and an application programming interface (API) feature.

15. The method of claim 10, wherein the plurality of features includes an op code feature, a file format feature, and an application programming interface (API) feature.

16. The method of claim 10, wherein detecting a previously unknown malware packer is performed using a security platform of a cloud service.

17. A computer program product embodied in a non-transitory computer readable medium and comprising computer instructions for:
receiving a plurality of samples for malware packer detection analysis;
performing a packer filter to determine whether a sample of the plurality of samples is packed, comprising:
performing one or more of the following:
A) determining that the sample includes a Microsoft portable executable (PE) file and that the Microsoft Windows PE file is suspicious, comprising:
determining that the Microsoft Windows PE file is abnormal, wherein an abnormal Microsoft Windows PE file includes a last section of the Microsoft Windows PE file has exec permissions, a first section of the Microsoft Windows PE file has write permissions, an entry point address of the Microsoft Windows PE file is outside of the Microsoft Windows PE file, an import table of the Microsoft Windows PE file is abnormal, or any combination thereof; and
in response to a determination that the Microsoft Windows PE file is abnormal, determining that the sample is suspicious;
B) determining that the sample includes an overlay and that the overlay is suspicious, comprising:
determining that the sample includes the overlay; and
in the event that the sample include the overlay:
determining that an entropy of the overlay exceeds an entropy threshold; and
in response to a determination that the entropy of the overlay exceeds the entropy threshold, determining that the sample is suspicious;
emulating each of the packed samples to extract a plurality of features; and
clustering the packed samples based on the extracted features.

18. The computer program product of claim 17, wherein the plurality of features includes at least one or more of the following: an op code feature, a file format feature, and an application programming interface (API) feature.

19. The computer program product of claim 17, wherein detecting a previously unknown malware packer is performed using a security platform of a cloud service.

20. A system, comprising:
a processor configured to:
receive a sample for inline malware packer detection analysis;
perform a packer filter to determine whether the sample is packed, comprising to:
perform one or more of the following:
A) determine that the sample includes a Microsoft portable executable (PE) file and that the Microsoft Windows PE file is suspicious, comprising to:
determine that the Microsoft Windows PE file is abnormal, wherein an abnormal Microsoft Windows PE file includes a last section of the Microsoft Windows PE file has exec permissions, a first section of the Microsoft Windows PE file has write permissions, an entry point address of the Microsoft Windows PE file is outside of the Microsoft Windows PE file, an import table of the Microsoft Windows PE file is abnormal, or any combination thereof; and
in response to a determination that the Microsoft Windows PE file is abnormal, determine that the sample is suspicious;
B) determine that the sample includes an overlay and that the overlay is suspicious, comprising to:
determine that the sample includes the overlay; and
in the event that the sample include the overlay:
determine that an entropy of the overlay exceeds an entropy threshold; and
in response to a determination that the entropy of the overlay exceeds the entropy threshold, determine that the sample is suspicious;

compare with known packer clusters to determine whether the sample is associated with a known malware packer; and perform a responsive action based on a malware packer verdict; and a memory coupled to the processor and configured to provide the processor with instructions.

* * * * *